United States Patent [19]
Kim et al.

[11] Patent Number: 5,660,931
[45] Date of Patent: Aug. 26, 1997

[54] POLYMERIC FILM WITH PAPER-LIKE CHARACTERISTICS

[75] Inventors: Moon-Sun Kim; Sang-Il Kim, both of Suwon-si; Young-Jin Lee, Anyang-si; Bum-Sang Kim, Seoul; Ju-Ik Son, Suwon-si, all of Rep. of Korea

[73] Assignee: SKC Limited, Kyungki-do, Rep. of Korea

[21] Appl. No.: 402,578

[22] Filed: Mar. 13, 1995

[30] Foreign Application Priority Data

| Mar. 17, 1994 | [KR] | Rep. of Korea | 94-5370 |
| Mar. 19, 1994 | [KR] | Rep. of Korea | 94-5548 |
| Oct. 6, 1994 | [KR] | Rep. of Korea | 94-25500 |
| Dec. 1, 1994 | [KR] | Rep. of Korea | 94-32361 |
| Dec. 9, 1994 | [KR] | Rep. of Korea | 94-33403 |

[51] Int. Cl.$^6$ .................. B32B 19/00; C08F 20/00
[52] U.S. Cl. .................. 428/357; 525/11; 525/12; 525/13; 525/14; 525/15; 525/20; 525/165; 525/166; 525/240; 525/437; 525/445; 524/81; 524/115; 524/127; 524/128; 524/403; 524/413; 524/414; 428/402

[58] Field of Search .................. 525/11, 12, 13, 525/14, 15, 20, 165, 166, 240, 437, 445; 524/81, 115, 127, 128, 403, 413, 414; 428/357, 402

[56] References Cited

FOREIGN PATENT DOCUMENTS

| 58-50625 | 3/1983 | Japan . |
| 62-243120 | 9/1987 | Japan . |
| 63-168441 | 7/1988 | Japan . |
| 2-206622 | 8/1990 | Japan . |

*Primary Examiner*—Samuel A. Acquah
*Attorney, Agent, or Firm*—Anderson Kill & Olick P.C.

[57] ABSTRACT

A biaxilly oriented polymer film having improved surface properties, anti-static property and printability is prepared from a mixture of 70 to 99 parts by weight of a polyester resin containing not less than 60% by weight of repeating units of ethylene terephthalate and having an intrinsic viscosity ranging from 0.4 to 0.9 dl/g, and 1 to 30 parts by weight of polyolefin resin having a melting flow index ranging from 1.5 to 25 g/10 min, wherein said polyester film further comprises 0.1 to 25 parts by weight of an inorganic particle.

2 Claims, No Drawings

POLYMERIC FILM WITH PAPER-LIKE CHARACTERISTICS

FIELD OF THE INVENTION

The present invention relates to a polymeric film and, more particularly, to a polymeric film having improved printability and antistatic property which is useful as a paper substitute, high-grade packaging material, food wrapping material and the like.

BACKGROUND OF THE INVENTION

Polyesters are known to possess good chemical and physical stability, high mechanical strength, durability, heat and chemical resistance and electrical insulation properties; and, therefore, have been widely used in manufacturing various industrial products. In particular, polyethylene terephthalate films, due to their good elasticity, dimensional stability and slipperiness, have been used as magnetic recording media, condensers, photographic films, industrial products, packaging and labelling materials and the like.

Recently, polyester films have been increasingly used as a paper substitute in a variety of applications. However, such polyester films differ from paper in clarity, color and rigidity; and are rather inconvenient for use due to their high density.

Extensive attempts have been made to develop low-weighted polyester films with a paper-like softness while maintaining their desired properties. For example, Japanese Patent Laid-open Publication Nos. 87-243120 and 90-206622 describe the incorporation of inorganic particles into a polyester; Japanese Patent Laid-open Publication No. 83-50625 discloses a method for preparing a low-weighted polyester film by incorporating a foaming agent in a polyester; and Japanese Patent Laid-open Publication Nos. 82-49648 and 88-168441 offer a method for preparing a low-weighted polymeric film with improved surface properties by blending a polyolefin resin with a polyester and extending the resultant mixture to form microvoids on the surface and inside of the film obtained therefrom.

However, such attempts have their own drawbacks and problems. When a large amount of inorganic particles are incorporated in a polyester film, its density tends to increase. In case a foaming agent is incorporated in a polyester, the microvoids formed become poorly dispersed and physical properties of the film are difficult to control. Further, in case a polyolefin resin is blended with a polyester, due to the poor heat resistance of the polyolefin, the mechanical properties of the resulting polymer film are apt to deteriorate. Also, since a polyolefin tends to generate and accumulate static electricity, the polyester film blended with a polyolefin may become highly electrostatic and suffer from low printability, which would limit its usage as a paper substitute.

SUMMARY OF THE INVENTION

It is, therefore, a primary object of the present invention to provide a low-weighted polymeric film having paper-like characteristics, improved anti-static property and printability.

In accordance with the present invention, there is provided a biaxially oriented polymeric film prepared from a mixture of 70 to 99 parts by weight of a polyester resin containing not less than 60% by weight of repeating units of ethylene terephthalate and having an intrinsic viscosity ranging from 0.4 to 0.9 dl/g, and 1 to 30 parts by weight of a polyolefin resin having a melting flow index ranging from 1.5 to 25g/10 min, said film containing 0.1 to 25 parts by weight of an inorganic particle.

Representative inorganic particles which may be used in the present invention include titanium dioxide, silica, alumina, calcium carbonate, barium sulfate, magnesium oxide, talc and a mixture thereof. Among these, rutile-type titanium dioxide, titanium dioxide coated with a metal such as silver, copper, zinc and the like, and silica coated with a metal are preferred.

Suitable polyolefin resins for the present invention include polyethylene, polypropylene, polymethylpentene and a mixture thereof.

The polymeric film in accordance with the present invention may also comprise 0.005 to 0.5 part by weight of a fluorescent organic whitening agent, 0.01 to 10 parts by weight of an antistatic agent or 0.005 to 0.5 part by weight of a thermal stabilizer.

DETAILED DESCRIPTION OF THE INVENTION

In practicing the inventive process, mixing a polyolefin resin with a polyester resin at a suitable ratio entails a low density in the film obtained from the polymeric mixture; incorporating a suitable amount of an inorganic compound imparts whiteness and hiding power to the film; and optionally incorporating a fluorescent organic whitening agent, an antistatic agent and/or a thermal stabilizer produces improved processability, heat resistance, good antistatic property and printability to the film.

A preferred embodiment of the polymeric film of the present invention is prepared from a mixture of 70 to 95 parts by weight of a polyester resin and 5 to 30 parts by weight of polypropylene resin, said film containing 0.01 to 1.0 part by weight of a metal sulfonate of the following formula (I) having an acid value of 0.1 mg KOH/g or less, and 1.0 to 10 parts by weight of a metal-coated silica having an average particle diameter ranging from 1 to 5 µm:

$$R_1-C_6H_4-SO_3M_e \quad (I)$$

wherein:

$R_1$ is a $C_5-C_{25}$, preferably $C_8-C_{20}$, alkyl group; and $M_e$ is an alkali or alkali earth metal.

Another preferred embodiment of the polymeric film of the present invention is prepared from a mixture of 70 to 95 parts by weight of a polyester resin and 5 to 30 parts by weight of a polypropylene resin, said film containing 0.1 to 10% by weight of a copolymer of 50 mole% of a polymer having a repeating unit of an acid amide group of the following formula (II) and 50 mole% of polyethylene glycol having a repeating unit of the following formula (III), and 1 to 20% by weight of a rutile-type titanium dioxide having an average particle diameter ranging from 0.1 to 3 µm:

$$+NH-(CH_2)_5-\underset{\underset{O}{\|}}{C}+ \quad (II)$$

$$+CH_2-CH_2-O+ \quad (III)$$

A further preferred embodiment of the polymeric film of the present invention is prepared from a mixture of 100 parts by weight of a polyester resin and 5 to 40 parts by weight of a polyolefin resin, said film further containing 0.1 to 20 parts by weight of a rutile-type titanium dioxide having an average particle diameter ranging from 0.1 to 3 µm and 0.05 to 0.30 part by weight of a fluorescent organic whitening agent, and said film being coated with a quaternary ammonium salt of the following formula(IV) in an amount ranging from 0.01 to 0.1 g/m²:

wherein:

$R_2$ is a $C_{10}$–$C_{20}$ alkyl group;

$R_3$ is a $C_1$–$C_3$ hydrocarbon;

$R_4$ and $R_5$ are independently a $C_1$–$C_4$ alkyl group; and

X is a counter anion.

A still another preferred embodiment of the polymeric film of the present invention is prepared from a resin mixture of 100 parts by weight of a polyester resin and 1 to 20 parts by weight of a polyolefin resin, said film containing 1 to 20 parts by weight of a rutile-type titanium dioxide having an average particle diameter ranging from 0.01 to 1 μm coated with zinc in an amount ranging from 0.01 to 0.15% by weight, based on the weight of the titanium dioxide, 0.01 to 1 part by weight of calcium carbonate having an average particle diameter ranging from 0.1 to 10 μm, and 0.01 to 1 part by weight of γ-alumina having an average particle diameter ranging from 0.01 to 1 μm.

A still further preferred embodiment of the polymeric film of the present invention is prepared from a mixture of 100 parts by weight of a polyester resin and 5 to 40 parts by weight of a polyolefin resin, said film containing 0.1 to 15 parts by weight of at least one inorganic compound selected from the group consisting of barium sulfate, titanium dioxide, silicon dioxide, calcium carbonate, magnesium oxide and talc, 0.0005 to 0.5 part by weight of a fluorescent organic whitening agent, 0.005 to 0.5 part by weight of a phosphate compound, and 0.005 to 0.5 part by weight of a hindered phenol compound.

The polyester which can be employed in the present invention has an intrinsic viscosity ranging from 0.4 to 0.9 dl/g, preferably from 0.5 to 0.8 dl/g, when determined at a concentration of 0.3 g per 25 ml of orthochlorophenol at a temperature of 35° C. The polyester may be prepared by the polycondensation of a polyhydric organic acid and a polyhydric alcohol. The organic acid suitable for use in the present invention includes carboxylic acids, preferably aromatic dicarboxylic acids; and the alcohol includes glycols, preferably akylene glycols.

Representative of the aromatic dicarboxylic acids include: dimethyl terephthalic acid, terephthalic acid, isophthalic acid, naphthalene dicarboxylic acid, cyclohexane dicarboxylic acid, diphenoxyethane dicarboxylic acid, diphenyl dicarboxylic acid, diphenyl ether dicarboxylic acid, anthracene dicarboxylic acid and α,β-bis(2-cholorophenoxy)ethane-4, 4'-dicarboxylic acid. Among these, dimethyl terephthalic acid and terephthalic acid are most preferred.

Exemplary alkylene glycols include: ethylene glycol, trimethylene glycol, tetramethylene glycol, pentamethylene glycol, hexamethylene glycol and hexylene glycol. Among these, ethylene glycol is most preferred.

The polyester of the present invention comprises at least 60% by weight of homopolyester of polyethylene terephthalate and the remainder being other units. The copolymer components include: diol compounds such as diethylene glycol, propylene glycol, neopentyl glycol, polyethylene glycol, p-xylene glycol, 1,4-cyclohexane dimethanol and sodium 5-sulforesorcine; dicarboxylic acids such as adipic acid and sodium 5-sulfoisophthalic acid; and polyfunctional carboxylic acids such as trimellitic acid, pyromellitic acid and the like.

The polyolefin resin suitable for use in the present invention has a melting flow index ranging from 1.5 to 25, preferably 2.5 to 15 g/10 min (200° C., 5 kg); and may be mixed with the polyester resin at a ratio ranging from 1 to 30 parts by weight on the basis of 100 parts by weight of the resin mixture.

When the polyolefin resin together with the polyester resin is mixed, extruded, and then extended to form a film, microvoids are formed on the surface and inside of the film, imparting improved surface properties as well as low-density to the film.

Suitable polyolefin resins include polyethylene, polypropylene, polymethylpentene and a mixture thereof. The polypropylene resin, for example, may be prepared from homopolypropylene containing at least 60% by weight of polypropylene and the remainder being other units. The copolymer components include acrylonitrile, butadiene and the like.

In accordance with the present invention, inorganic particles which can be added to the polymeric film include titanium dioxide, silica, alumina, calcium carbonate, barium sulfate, magnesium oxide, talc and a mixture thereof.

Titanium dioxide is classified into rutile-type and anatase-type in terms of its crystalline structure. The anatase-type titanium dioxide of cubic crystalline structure is highly hygroscopic to coagulate during its compounding process; and therefore, the optical properties of the surface of the film tend to deteriorate and the film containing same may easily degenerate when exposed to external environments, such as temperature, light and moisture. The rutile-type titanium dioxide of hexagonal crystalline structure, which is employed in the present invention, can absorb ultraviolet light harmful to the film, thereby preventing the polymer from being degenerated by ultraviolet light.

The titanium dioxide influences the hiding power, degree of whiteness and transmittance of the polyester film. To improve the hiding power, it is important to maximize the light scattering effect, which can be determined by measuring the distance between the inorganic particles therein and the average particle diameter thereof. If the inorganic particles are too large and the distances between them are too short, light scattering hardly occurs; while, on the other hand, if the inorganic particles are too small, light tends to pass through them without any scattering. Therefore, the diameter of titanium dioxide is preferably smaller than one-half of the wavelength of the light to be scattered.

In order to meet with the above mentioned conditions, the rutile-type titanium dioxide is selected to have an average particle diameter ranging from 0.1 to 3.0 μm, and is added in an amount ranging from 0.1 to 25 parts by weight on the basis of 100 parts by weight of the polymer resin.

In particular, to improve the light resistance of the film, titanium dioxide is preferably coated with zinc in an amount ranging from 0.01 to 0.15% by weight on the basis of titanium dioxide.

The silica which may be used as an inorganic filler of the present film preferably has an average particle diameter ranging from 1.0 to 5.0 μm and may be added in a suitable amount depending on the thickness and the use of the film. Especially, in case that the film is used as a packaging material to conserve the content in a fresh state, the silica is preferably coated with a metal having a good adsorption and decomposition capability such as silver, copper, zinc and the like.

The calcium carbonate which may be used as an inorganic filler of the present film preferably has an average particle diameter ranging from 0.1 to 10 μm.

Further, the alumina, which may be used to impart scratch-resistance to the present film, preferably has a γ crystalline structure and has an average particle diameter ranging from 0.01 to 1 μm, and preferably from 0.1 to 0.5 μm.

In addition to the above inorganic fillers, magnesium oxide, barium sulfate, talc and the like may be used in the present invention. Their average particle diameters and amounts to be added will depend on the thickness and uses of the film. For a paper-substitutes film, those having an average particle diameter ranging from 0.1 to 0.5 μm are preferred.

Additionally, a fluorescent organic whitening agent may be incorporated in the present film. The fluorescent organic whitening agent increases the reflectivity of the film at the visible region, by absorbing the light energy of ultraviolet region(330–380 nm), transferring the energy to the visible region (400–450 nm), and then emitting the light. At least one of the organic dyes selected from stilbene, oxazoles and bisbenzoazoles are used as the fluorescent organic whitening agent. The whitening agent is added in an amount so that the reflectivity at 440 nm becomes greater than 75%.

Also, an antistatic agent may be added to the film of the present invention. One of the preferred anti-static agents is a metal sulfonate of the formula (I) having an acid value not more than 1.0 mgKOH/g:

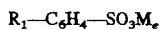    (I)

wherein, $R_1$ is a $C_5$–$C_{25}$, preferably $C_8$–$C_{20}$, alkyl group; and $M_e$ is an alkali or alkali earth metal.

Suitable metal sulfonates include: potassium octylbenzenesulfonate, potassium nonylbenzenesulfonate, potassium undecylbenzenesulfonate and a mixture thereof. Such incorporation of the metal sulfonate imparts a good anti-static property to the film as well as increases surface tension of the film, thereby improving the receptiblity to ink and other coating compositions.

Another anti-static agent which may be used in the present invention is a copolymer of 50 mole% of a polymer having a repeating unit of an acid amide group of the following formula (II) and 50 mole% of polyethylene glycol having a repeating unit of the following formula (III).

    (II)

    (III)

Preferably, the polymer having the repeating unit of the acid amide group has a molecular weight of 1,000 to 200,000; and the polyetylene glycol has a molecular weight of 500 to 100,000.

In accordance with one embodiment of the present invention, an anti-static agent may be coated on the surface of the film. For example, a quaternary ammonium salt of the following formula (IV) is externally coated on the surface of a sheet or an oriented film:

    (IV)

wherein, $R_2$ is a $C_{10}$–$C_{20}$ alkyl group;

$R_3$ is a $C_1$–$C_3$ hydrocarbon;

$R_4$ and $R_5$ are independently a $C_1$–$C_4$ alkyl group; and

X is a counter anion.

Representative quaternary ammonium salts of the formula (IV) include: butyloxyethyl hydroxyethyl orthodecyloxy ammonium salt, bishydroxy decylpropyl ammonium salt, hydroxybutyl dodecyloxybutyl ethylammonium salt and the like.

The quaternary ammonium salt is preferably dissolved in water in a concentration ranging from 0.1 to 10% by weight, preferably from 2 to 5% by weight; and the aqueous solution is coated on the surface of the polymeric film. The amount of the quaternary ammonium salt coated on the film preferably ranges from 0.01 to 0.1 g/m².

The aqueous solution of the ammonium salt is applied on an amorphous cast sheet, and then the sheet is drawn in one or two directions. The drawing process may be conducted at a temperature ranging from 60° to 150° C.; and the drawing ratio may range from 2.5 to 6.0 in a longitudinal direction and from 2.5 to 6.0 in a transverse direction. Alternatively, the aqueous solution of the ammonium salt may be applied on the surface of the oriented film. To maximize the anti-static property of the film, it is preferred to thermally set the oriented film at a high temperature above 250° C.

The polymeric film prepared as described above has a surface resistance below $10^9 \Omega$. Consequently, adhesion of other substances on the surface can be effectively prevented; and receptivity to ink and various coating compositions is improved.

The polymeric film of the present invention may further contain a phosphate, phosphite or hindered phenol compound as a thermal stabilizer. These stabilizers prevent thermal decomposition of the polyester as well as increase heat resistance of the polyolefin. In case that the heat-resistance of the polyolefin is poor, production of an oligomer increases during the extrusion molding and heat-aging processes, which in turn may degrade the mechanical properties of the resulting film and turn the color thereof to yellow.

Representative of the phosphate and phosphite compounds include: triphenylphosphate, tricresylphosphate, trimethylphosphate, triethylphosphate, tributylphosphate, trixylenylphosphate, xylenyldiphenylphosphate, cresyldiphenylphosphate, distearylpentaerythritoldiphosphite, bis-2,4-di-t-butylphenyl-pentaerythritoldiphosphite, tris-2,4-di-t-butylphenylphosphite and the like. This phosphate or phosphite compound can be used either alone or in a mixture of 2 or more.

Further, a hindered phenol compound inhibits the occurrence of a radical chain reaction in the first thermal oxidation of the polyolefin, and improves heat-resistance of polyolefin, along with the phosphate compound. Examples of the hindered phenol compound include: tetrakis 3,5-di-t-butylhydroxy phenylpropanoyloxymetylmethane, octadecyl-3-3,5-di-t-butyl-4-hydroxyphenylpropanoate, 2-hydroxy-4-n-octyloxybenzophenone, 2,4-di-t-butylphenyl-3,5-di-t-butyl-4-hydroxybenzoate. These compounds can be used either or in a mixture of 2 or more.

In addition to the above ingredients, the polymeric film of the present invention may further comprise other common additives such as polycondensation catalyst, dispersing agent, other anti-static agent, crystallization accelerator, nucleating agent or anti-blocking agent, in effective amounts which do not adversely affect the desired characteristics of the inventive film.

For the preparation of the polymeric film of the present invention, these additives may be incorporated by way of melt-mixing process, rather than a dry mixing process. That is, the primary resin mixture incorporating each of the additives in their respective final concentration is melt-mixed again, extruded and extended in at least one direction to form a film having a bulk density ranging from 0.9 to 1.2 g/cc.

In the present invention, the melt-mixing process is preferably conducted using a compounder with two rotational axes. The temperature of the region where the resins and the additives are incorporated(Ti) ranges from 200° to 250° C., and the temperature of the region where the melt-mixing process is completed(Tf) ranges from 215° to 265° C. Further, the rotation speed and the amount of extrusion should be controlled so that the temperature of the extruded resin mixture(Tp) may range from 225° to 285° C.

The following Examples are intended to illustrate the present invention more specifically, without limiting the scope of the invention. "Part(s)" and "%" in the Examples and Comparative Examples represent "part(s) by weight" and "% by weight", respectively.

In Examples and Comparative Examples, the properties of the polymer film were evaluated in accordance with the following methods.

1. Bulk Density

The bulk density of the film was measured by way of floating method while maintaining the density gradient column comprised of carbon tetrachloride and n-heptane at 25° C.

2. Surface gloss

The surface gloss of the film was measured in accordance with ASTM D523 at a angle of 60° using a black mirror as a standard mirror.

3. Transmittance

The transmittance was determined in accordance with ASTM D1003 at a scattering angle of 2.5° using a sample having a diameter of 25 mm.

4. Color-b and Reflectivity at 440 nm

By way of employing a light source color difference meter (Zeniru Industrial Inc. of Japan, Model No.:SZS-Σ80), the reflectivity at 440 nm was determined as the percentage of the light reflected at 440 nm; and Color-b was measured at an angle of 2° using a C light source as a measuring light source.

5. Degree of Whiteness

The degree of whiteness was determined in accordance with JIS-L-1015 using the following formula:

$$\text{Degree of Whiteness} = 4B - 3G$$

wherein B represents the percentage of the light reflected at 450 nm and G represents the percentage of the light reflected at 550 nm.

6. Anti-static Property

The surface resistance of the film was measured by using an insulation resistance measurement (Hewlett-Packard Company, U.S.A.) at 23° C. and 60% of relative humidity. The applied voltage was 500 V. The measured value was given in ohm($\Omega$) unit. As the surface resistance of the film decreases, the anti-static property thereof increases.

7. Receptivity to an ink/Coating Composition—Printability

The printability of the film was evaluated by measuring the degree of coagulation of Rulee Index Standard Solution (Gakoujinyaku Co. of Japan) on the surface of the film, on the basis of the following:

○: no coagulation

Δ: 2 to 4 coagulations per unit area(10 cm×10 cm)

X: more than 5 coagulations per unit area(10 cm×10 cm)

8. Dispersibility

The dispersibility was measured by the change of the filter pressure ($\Delta P$) loaded at 200 mesh filter after given time when the resin was extruded at 30 kg/h using Pilot extruder.

9. Strength at breakage

The strength at breakage of the film was determined by measuring the tensile strength of the film in accordance with ASTMD882 using UTM4206 (Instron).

10. Heat Stability

The heat stability of the film was determined by measuring the degree of contraction after standing 10 minutes at 190° C.

11. Maintenance of freshness

The maintenance of freshness by the prepared film is evaluated by judging the change of freshness of contents packed in the film, on the basis of the following:

○: freshness is well-maintained

Δ: freshness is well-maintained in general, but some of the content is withered

X: freshness is poorly maintained

12. Degree of Extension

The degree of extension is evaluated on the basis of the following:

○: uniform film with no breakage and no extension spot

Δ: uniform film with a little breakage and no extension spot

X: film with a large breakage and some extension spots

13. Light Resistance

The light resistance of the film was determined by measuring Color-L of the film after UV irradiation for 30 hours at 60° C. by way of employing a light source color difference meter(Zeniru Industrial Inc. of Japan, Model No.:SZS-Σ80). As the value of Color-L is decreased, light resistance of the film is increased.

14. Scratch Resistance

The scratch resistance of the film is evaluated by way of employing runnability evaluation instrument (Yokohama Industrial Inc. of Japan, Model No.:TBT-300D). The film was cut by width of 1.5 inches and Cr alloy drum was run once thereover at an angle of 135° and at a speed of 4 m/s under the tension of 50 g, and then the state of scratch is evaluated on the basis of the following:

●: one scratch in wide direction

Δ: 2 to 4 scratches in wide direction

X: more than 5 scratches in wide direction

15. Processability

The slitting state in the cross-section of the film is judged on the basis of the following:

●: the cross-section of the film is uniform and clear

Δ: the uniformity of the cross-section is good in general with some defects

X: the cross-section has many defects

EXAMPLE 1-1

60 parts of dimethyl terephthalate and 40 parts of ethylene glycol were transesterified in the present of 0.03 part of zinc acetate as a transesterification catalyst to form a polyethylene terephthalate monomer, i.e., bis-2-hydroxyethyl terephthalate. To the resultant, 0.03 part by weight of the antimony trioxide as a polycondensation catalyst was added and the mixture was polycondensed to obtain a polyester having an intrinsic viscosity of 0.610 dl/g. The obtained polyester was mixed with 20 parts of polypropylene resin having a melting flow index of 8.0 g/10 min to give 100 parts of a resin mixture. To the obtained mixture, 0.20 part of potassium octylbenzene sulfonate and 6 parts of porous silica having an average particle diameter of 2 μm were added, then the resultant was melt blended to form a resin mixture. The porous silica used was previously coated with copper by using 0.05% copper dioxide in methanol.

The temperature of the inlet of the blender where the additives were incorporated (Ti) was 245° C., the temperature of the outlet(Tf) was 260° C., and the temperature of the extruded resin mixture(Tp) was 275° C.

The obtained resin mixture was dried, melted, and extruded to form a cast sheet. The sheet was extended in a drawing ratio of 3.5:1 in the longitudinal and transverse directions at 90° C. to provide biaxially oriented, white colored polymer film having the thickness of 12 μm.

The properties of the film were measured and the results were shown in Table 1.

As shown in Table 1 below, the film thus prepared exhibits excellent properties in general.

EXAMPLES 1-2 to 1-5

The procedure of Example 1-1 was repeated except that the amounts of the polypropylene resin and the additives were varied as shown in Table 1 below.

The properties of the film were measured and the results were shown in Table 1.

EXAMPLES 1-6 to 1-10

The procedure of Example 1-1 was repeated except that the silica coated with zinc or silver by using a methanol solution of zinc oxide or metal silver was used.

The properties of the film were measured and the results were shown in Table 1.

Comparative Examples 1-1 to 1-10

The procedure of Example 1-1 was repeated except that the amounts of the polypropylene resin and the additives were varied as shown in Table 1 below.

The properties of the film were measured and the results were shown in Table 1.

TABLE 1

| | | | Additives | | | | | Melt Mixing Condition | | | | | | Extruded | | Amount |
| | | | | Silica | | Anti- | | | | | | | | Resin | Rota- | of |
| Exam. & Comp. Exam. | | Poly-propylene part | coating ion | particle diameter μm | Amount part | static Agent part | Ti | $T_2$ | $T_3$ | Temp. $T_4$ | $T_5$ °C. | $T_6$ | $T_f$ | Temp. Tp | tion Speed rpm | Extrusion Kg/H |
|---|---|---|---|---|---|---|---|---|---|---|---|---|---|---|---|---|
| Ex. | 1-1 | 20 | Cu | 2.0 | 6 | 0.20 | 245 | 255 | 260 | 260 | 260 | 260 | 260 | 275 | 400 | 30 |
| | 1-2 | 15 | Cu | 1.5 | 5 | 0.24 | 250 | 259 | 263 | 264 | 265 | 265 | 265 | 280 | 385 | 28 |
| | 1-3 | 15 | Cu | 2.1 | 8 | 0.31 | 245 | 255 | 260 | 261 | 260 | 260 | 260 | 275 | 395 | 31 |
| | 1-4 | 14 | Cu | 1.8 | 5 | 0.15 | 252 | 262 | 263 | 264 | 265 | 265 | 265 | 278 | 388 | 26 |
| | 1-5 | 20 | Cu | 1.2 | 2 | 0.21 | 254 | 264 | 265 | 265 | 265 | 265 | 265 | 281 | 401 | 28 |
| | 1-6 | 10 | Zn | 2.5 | 3 | 0.20 | 246 | 256 | 258 | 260 | 264 | 264 | 264 | 281 | 389 | 29 |
| | 1-7 | 20 | Zn | 2.1 | 4 | 0.28 | 250 | 259 | 264 | 264 | 265 | 265 | 265 | 278 | 394 | 25 |
| | 1-8 | 25 | Zn | 2.5 | 5 | 0.40 | 254 | 264 | 265 | 265 | 265 | 265 | 265 | 278 | 392 | 31 |
| | 1-9 | 20 | Ag | 3.1 | 6 | 0.24 | 245 | 255 | 260 | 262 | 264 | 265 | 265 | 281 | 385 | 29 |
| | 1-10 | 15 | Ag | 2.8 | 8 | 0.38 | 251 | 258 | 265 | 265 | 265 | 265 | 265 | 275 | 384 | 27 |
| Comp. Ex. | 1-1 | 15 | — | 2.0 | 5 | 0.24 | 245 | 255 | 256 | 260 | 260 | 260 | 260 | 275 | 389 | 28 |
| | 1-2 | 0 | Cu | 2.0 | 8 | 0.27 | 245 | 255 | 255 | 260 | 260 | 260 | 260 | 275 | 400 | 27 |
| | 1-3 | 10 | Cu | 0.3 | 5 | 0.18 | 245 | 255 | 255 | 261 | 261 | 264 | 264 | 275 | 400 | 25 |
| | 1-4 | 15 | Cu | 6.2 | 5 | 0.24 | 245 | 255 | 255 | 260 | 260 | 264 | 265 | 275 | 398 | 28 |
| | 1-5 | 20 | Cu | 2.0 | 0.05 | 0.24 | 245 | 255 | 257 | 264 | 264 | 265 | 265 | 277 | 389 | 27 |
| | 1-6 | 15 | Cu | 2.0 | 15 | 0.20 | 245 | 256 | 256 | 260 | 264 | 264 | 265 | 275 | 401 | 26 |
| | 1-7 | 12 | Cu | 2.0 | 6 | 0 | 250 | 255 | 255 | 260 | 265 | 265 | 265 | 278 | 398 | 28 |
| | 1-8 | 15 | Cu | 2.0 | 6 | 1.45 | 245 | 255 | 255 | 260 | 260 | 260 | 265 | 275 | 400 | 30 |
| | 1-9 | 15 | Cu | 2.0 | 6 | 0.24 | 170 | 175 | 180 | 180 | 185 | 185 | 190 | 210 | 250 | 30 |
| | 1-10 | 15 | Cu | 2.0 | 6 | 0.24 | 270 | 275 | 285 | 285 | 285 | 290 | 290 | 315 | 500 | 25 |

| | | | Physical Properties of Film | | | |
|---|---|---|---|---|---|---|
| Exam. & Comp. Exam. | | Bulk Density g/CC | Surface Resistance Ω | Strength at Breakage Kg/mm² | Maintenance of freshness — | Degree of extension — |
| Ex. | 1-1 | 1.05 | $10^{12}$ | 23.1 | O | O |
| | 1-2 | 1.11 | $10^{12}$ | 24.1 | O | O |
| | 1-3 | 1.01 | $10^{11}$ | 22.1 | O | O |
| | 1-4 | 0.99 | $10^{13}$ | 23.1 | O | O |
| | 1-5 | 0.98 | $10^{12}$ | 22.8 | O | O |
| | 1-6 | 1.12 | $10^{13}$ | 23.4 | O | O |
| | 1-7 | 1.04 | $10^{11}$ | 22.5 | O | O |
| | 1-8 | 1.02 | $10^{10}$ | 23.9 | O | O |
| | 1-9 | 1.13 | $10^{12}$ | 24.4 | O | O |
| | 1-10 | 1.06 | $10^{11}$ | 22.9 | O | O |
| Comp. Ex. | 1-1 | 1.11 | $10^{12}$ | 23.1 | Δ | O |
| | 1-2 | 1.40 | $10^{12}$ | 24.7 | O | O |
| | 1-3 | 1.21 | $10^{12}$ | 22.1 | Δ | X |
| | 1-4 | 1.24 | $10^{12}$ | 23.1 | O | X |

TABLE 1-continued

|  |  |  |  |  |  |
|---|---|---|---|---|---|
| 1-5 | 1.05 | $10^{12}$ | 22.4 | X | Δ |
| 1-6 | 1.41 | $10^{12}$ | 23.1 | O | X |
| 1-7 | 1.11 | $10^{18}$ | 22.8 | O | O |
| 1-8 | 1.02 | $10^{12}$ | 17.2 | O | X |
| 1-9 | 1.20 | $10^{12}$ | 22.5 | O | X |
| 1-10 | 1.40 | $10^{14}$ | 23.1 | Δ | O |

As shown from the results of the above table 1, the polymer film prepared from a mixture of 70 to 95 parts of the polyester resin and 5 to 30 parts of the polypropylene resin, which comprises 1.0 to 10 parts of metal-coated silica and 0.01 to 1.0 part of anti-static agent, possesses significantly improved physical properties and low density.

EXAMPLE 2-1

60 parts of dimethyl terephthalate and 40 parts of ethylene glycol were transesterified in a conventional manner to form a polyethylene terephthalate monomer, i.e., bis-2-hydroxyethyl terephthalate. To the resultant, a conventional polycondensation catalyst was added and the mixture was polycondensed to obtain a polyester having an intrinsic viscosity of 0.611 dl/g.

The obtained polyester was mixed with 20 parts of polypropylene resin having a melting flow index of 8.0 to give 100 parts of a resin mixture. As operating conditions, Ti was 245° C., Tf was 260° C., rotation speed of the blender was 400 rpm, extrusion amount was 30 kg/H and the temperature of the extruded resin mixture(Tp) was 275° C.

To the resulting mixture, 1% of a copolymer of 50 mole% of a polymer having a repeating unit of an acid amide group and 50 mole% of polyethylene glycol, and 6% of a rutile-type titanium dioxide having an average particle diameter of 0.5 μm based on the total weight of the film was added to form a polymer chip. The obtained polymer chip was dried, melted, and extruded to form a cast sheet. The sheet was extended in a drawing ratio of 3.5:1 in the longitudinal and transverse directions at 120° C. to provide biaxially oriented polymer film having the thickness of 100 μm.

The properties of the film were measured and the results were shown in Table 2.

As shown in Table 1 below, the film thus prepared exhibits excellent properties in general.

EXAMPLES 2-2 to 2-10

The procedure of Example 2-1 was repeated except that the amounts of the polypropylene resin and the antistatic agent, particle diameter and amount of the titanium dioxide, melt mixing temperature, rotation speed and extrusion amount were varied as shown in Table 2 below.

The properties of the film were measured and the results were shown in Table 2.

Comparative Examples 2-1 to 2-8

The procedure of Example 2-1 was repeated except that the amounts of the polypropylene resin and the anti-static agent, particle diameter and amount of the titanium dioxide, melt mixing temperature, rotation speed and extrusion amount were varied as shown in Table 2 below. shown in Table 2.

TABLE 2

| | | Additives | | | | Melt Mixing Condition | | | | | | | | | |
|---|---|---|---|---|---|---|---|---|---|---|---|---|---|---|---|
| | | Dioxide | Titanium Anti- | | | Resin | | | | | | | Extruded Rota- | of | Amount |
| | | Poly- | particle | | static | Temp. | | | | | | | Temp. | tion | Extru- |
| Exam. & Comp. Exam. | | propylene parts | diameter μm | Amount %‡ | Agent %‡ | Ti | $T_2$ | $T_3$ | $T_4$ | $T_5$ °C. | $T_6$ | $T_f$ | Tp | Speed rpm | sion Kg/H |
| Ex. | 2-1 | 20 | 0.5 | 6 | 1.0 | 245 | 255 | 260 | 260 | 260 | 260 | 260 | 275 | 400 | 30 |
| | 2-2 | 5 | 0.1 | 4 | 2.0 | 250 | 259 | 263 | 264 | 265 | 265 | 265 | 280 | 385 | 28 |
| | 2-3 | 10 | 0.9 | 1 | 0.1 | 245 | 255 | 260 | 261 | 260 | 260 | 260 | 275 | 395 | 31 |
| | 2-4 | 15 | 1.0 | 10 | 5.0 | 252 | 262 | 263 | 264 | 265 | 265 | 265 | 278 | 388 | 26 |
| | 2-5 | 25 | 0.4 | 15 | 9.0 | 254 | 264 | 265 | 265 | 265 | 265 | 265 | 281 | 401 | 28 |
| | 2-6 | 30 | 2.0 | 20 | 10.0 | 246 | 256 | 258 | 260 | 264 | 264 | 264 | 281 | 389 | 29 |
| | 2-7 | 7 | 1.1 | 9 | 4.0 | 250 | 259 | 264 | 264 | 265 | 265 | 265 | 278 | 394 | 25 |
| | 2-8 | 13 | 3.0 | 11 | 0.5 | 254 | 264 | 265 | 265 | 265 | 265 | 265 | 278 | 392 | 31 |
| | 2-9 | 11 | 1.7 | 17 | 0.9 | 245 | 255 | 260 | 262 | 264 | 265 | 265 | 281 | 385 | 29 |
| | 2-10 | 22 | 2.2 | 19 | 7.0 | 251 | 258 | 265 | 265 | 265 | 265 | 265 | 275 | 384 | 27 |
| Comp. Ex. | 2-1 | 0 | 0.5 | 5 | 1.0 | 245 | 255 | 256 | 260 | 260 | 260 | 260 | 275 | 389 | 28 |
| | 2-2 | 35 | 0.5 | 5 | 2.27 | 245 | 255 | 255 | 260 | 260 | 260 | 260 | 275 | 400 | 27 |
| | 2-3 | 10 | — | 0 | 1.18 | 245 | 255 | 255 | 261 | 261 | 264 | 264 | 275 | 400 | 25 |
| | 2-4 | 10 | 0.4 | 30 | 0.24 | 245 | 255 | 255 | 260 | 260 | 264 | 265 | 275 | 398 | 28 |
| | 2-5 | 20 | 0.5 | 5 | 0 | 245 | 255 | 257 | 264 | 265 | 265 | 265 | 277 | 389 | 27 |
| | 2-6 | 15 | 0.5 | 7 | 15 | 245 | 256 | 256 | 260 | 264 | 264 | 265 | 275 | 401 | 26 |
| | 2-7 | 10 | 4.1 | 6 | 1.0 | 245 | 255 | 257 | 264 | 264 | 265 | 265 | 278 | 385 | 25 |
| | 2-8 | 15 | 3.5 | 8 | 1.0 | 245 | 256 | 256 | 260 | 264 | 264 | 265 | 276 | 399 | 26 |

TABLE 2-continued

|  | Exam. & Comp. Exam. | Bulk Density g/CC | Surface Resistance Ω | Strength at Breakage Kg/mm² | Degree of Whiteness — | Color-b Value — | Transmittance % | Dispersibility (ΔP) Kg/mm² | Degree of Extension — |
|---|---|---|---|---|---|---|---|---|---|
| Ex. | 2-1 | 1.01 | $10^{12}$ | 22.1 | 90 | 0.2 | 1.5 | 3 | ○ |
|  | 2-2 | 1.11 | $10^{11}$ | 22.4 | 91 | 0.1 | 1.6 | 4 | ○ |
|  | 2-3 | 1.01 | $10^{11}$ | 20.1 | 90 | 0.1 | 1.9 | 2 | ○ |
|  | 2-4 | 0.99 | $10^{10}$ | 21.1 | 89 | 0.2 | 1.2 | 3 | ○ |
|  | 2-5 | 0.98 | $10^{12}$ | 21.8 | 91 | 0.1 | 1.2 | 4 | ○ |
|  | 2-6 | 1.12 | $10^{11}$ | 20.9 | 90 | 0.1 | 1.1 | 4 | ○ |
|  | 2-7 | 1.04 | $10^{10}$ | 22.5 | 88 | 0.2 | 1.5 | 3 | ○ |
|  | 2-8 | 1.02 | $10^{10}$ | 21.9 | 94 | 0.1 | 1.6 | 3 | ○ |
|  | 2-9 | 1.13 | $10^{11}$ | 20.4 | 90 | 0.1 | 1.0 | 4 | ○ |
|  | 2-10 | 1.06 | $10^{9}$ | 21.9 | 87 | 0.2 | 1.0 | 3 | ○ |
| Comp. | 2-1 | 1.47 | $10^{11}$ | 23.1 | 90 | 0.1 | 1.5 | 4 | ○ |
| Ex. | 2-2 | 1.10 | $10^{12}$ | 18.5 | 89 | 0.1 | 1.4 | 3 | X |
|  | 2-3 | 1.21 | $10^{12}$ | 22.1 | 65 | 0.1 | 2.3 | 2 | Δ |
|  | 2-4 | 1.44 | $10^{12}$ | 23.1 | 91 | 0.1 | 1.3 | 11 | X |
|  | 2-5 | 1.31 | $10^{18}$ | 22.4 | 90 | 0.9 | 1.7 | 3 | ○ |
|  | 2-6 | 1.01 | $10^{9}$ | 23.1 | 74 | 0.1 | 1.4 | 4 | X |
|  | 2-7 | 1.21 | $10^{12}$ | 23.4 | 88 | 0.9 | 1.5 | 5 | X |
|  | 2-8 | 1.21 | $10^{12}$ | 23.5 | 84 |  | 1.6 | 6 | X |

Account based on the weight of the film

As shown from the results of the above table 2, the polymer film prepared from a mixture of 70 to 95 parts of the polyester resin and 5 to 30 parts of the polypropylene resin, which comprises 1.0 to 10% of a copolymer as an antistatic agent and 1 to 20% of a rutile-type titanium dioxide having an average particle diameter ranging from 0.1 to 3 μm, possesses excellent physical properties such as bulk density, surface resistance, strength at breakage, degree of whiteness, color-b value and transmittance as well as good dispersibility and extension property.

EXAMPLE 3-1

60 parts of dimethyl terephthalate and 40 parts of ethylene glycol were transesterified in a conventional manner to form a polyethylene terephthalate monomer, i.e., bis-2-hydroxyethyl terephthalate. To the resultant, a conventional polycondensation catalyst was added and the mixture was polycondensed to obtain a polyester having an intrinsic viscosity of 0.610 dl/g. 100 parts by weight of the obtained polyester was mixed with 10 parts of polypropylene resin. To the obtained mixture, 5 parts of a rutile-type titanium dioxide and 0.10 parts of a fluorescent organic whitening agent were added, and the resultant was melt-mixed. The rotation speed of the compounder was 350 rpm and the temperature of the extruded resin was 285° C.

Then, the obtained resin mixture was dried, melted, and extruded to form a cast sheet. The surface of the sheet was coated with 2% butyloxyethylhydroxyethyl orthodecyloxy ammonium sulfide aqueous solution, and the sheet was extended in a drawing ratio of 2.5:1 in the longitudinal and transverse directions at 120° C. to provide biaxially oriented film having the thickness of 50 μm.

The properties of the film were measured and the results were shown in Table 3.

As shown in Table 3 below, the film thus prepared exhibits excellent properties in general.

EXAMPLES 3-2 to 3-6

The procedure of Example 3-1 was repeated except that the amounts of the additives and the polypropylene resin were varied as shown in Table 3 below.

The properties of the film were measured and the results were shown in Table 3.

As shown in Table 3 below, the film thus prepared exhibits excellent properties in general.

Comparative Examples 3-1 to 3-8

The procedure of Example 3-1 was repeated except that the amounts of the additives and the polypropylene resin were varied as shown in Table 3 below.

The properties of the film were measured and the results were shown in Table 3.

TABLE 3

|  |  | Additives | | | | Physical Properties of Film | | | | | |
|---|---|---|---|---|---|---|---|---|---|---|---|
|  |  | Titanium Dioxide | Fluorescent Organic Whitening Agent (% by wieght) | Polypropylene | Antistatic Agent (g/m²) | Bulk Density (g/cc) | Surface Gloss (%) | Surface Resistance (Ω) | Strength at Breakage (Kg/mm²) | Color-b Value | Adhesiveness |
| Ex. | 3-1 | 5 | 0.10 | 10 | 0.05 | 1.06 | 45 | $10^{10}$ | 21.5 | 0.2 | ○ |
|  | 3-2 | 7 | 0.20 | 5 | 0.03 | 1.11 | 41 | $10^{9}$ | 22.1 | 0.1 | ○ |

TABLE 3-continued

| | | Additives | | | | Physical Properties of Film | | | | | |
|---|---|---|---|---|---|---|---|---|---|---|---|
| | | Titanium Dioxide | Fluorescent Organic Whitening Agent (% by wieght) | Poly- propylene | Anti- static Agent (g/m$^2$) | Bulk Density (g/cc) | Surface Gloss (%) | Surface Resis- tance (Ω) | Strength at Breakage (Kg/mm$^2$) | Color-b Value | Adhe- siveness |
| | 3-3 | 10 | 0.13 | 20 | 0.01 | 1.02 | 49 | 10$^{10}$ | 20.9 | 0.1 | ○ |
| | 3-4 | 16 | 0.05 | 15 | 0.09 | 1.01 | 45 | 10$^9$ | 21.1 | 0.2 | ○ |
| | 3-5 | 12 | 0.21 | 23 | 0.04 | 1.03 | 43 | 10$^{10}$ | 20.1 | 0.1 | ○ |
| | 3-6 | 1 | 0.15 | 32 | 0.07 | 1.01 | 45 | 10$^9$ | 20.2 | 0.1 | ○ |
| Comp. | 3-1 | 0 | 0.10 | 10 | 0.05 | 1.04 | 65 | 10$^{10}$ | 18.1 | 0.9 | Δ |
| Ex. | 3-2 | 25 | 0.10 | 10 | 0.05 | 1.06 | 41 | 10$^{10}$ | 21.0 | 0.1 | X |
| | 3-3 | 6 | 0 | 10 | 0.04 | 1.09 | 46 | 10$^9$ | 22.3 | 0.6 | Δ |
| | 3-4 | 4 | 0.50 | 15 | 0.03 | 1.03 | 45 | 10$^{10}$ | 16.5 | 0.3 | X |
| | 3-5 | 5 | 0.10 | 0 | 0.05 | 1.40 | 44 | 10$^9$ | 23.1 | 0.2 | Δ |
| | 3-6 | 5 | 0.10 | 45 | 0.05 | 1.01 | 43 | 10$^{10}$ | 12.5 | 0.3 | ○ |
| | 3-7 | 6 | 0.12 | 10 | 0 | 1.06 | 45 | 10$^{18}$ | 21.1 | 0.2 | Δ |
| | 3-8 | 5 | 0.10 | 10 | 0.20 | 1.02 | 46 | 10$^6$ | 19.5 | 0.2 | X |

As shown from the results of the above table 3, the polymer film prepared from a mixture of 100 parts of the polyester resin and 5 to 40 parts of the polypropylene resin, which comprises 0.1 to 20 parts of titanium dioxide having an average particle diameter ranging from 0.1 to 3 μm and 0.05 to 0.3 part of a fluorescent organic whitening agent, and is coated with quaternary ammonium salt in an amount ranging from 0.01 to 0.1 g/m$^2$, possesses an improved physical properties such as anti-static property, printability and heat resistance.

EXAMPLE 4-1

60 parts of dimethyl terephthalate and 40 parts of ethylene glycol were transesterified in the presence of a transesterification catalyst to form a polyethylene terephthalate monomer, i.e., bis-2-hydroxyethyl terephthalate. To the resultant, 5 parts of a cubic titanium dioxide having an average particle diameter of 0.5 μm, 0.002 part of a fluorescent organic whitening agent, 0.1 parts of bis 2,4-di-t-butyl phenylpentaerythritoldiphosphite, 0.1 part of triphenylphosphate, 0.15 part of tetrakis 3,5-di-t-butyl hydroxyphenylpropanoyloxymethyl methane, 0.25 part of calcium carbonate having an average particle diameter of 0.8 μm and 0.3 part of γ-alumina having an average particle diameter of 0.1 μm, based on 100 parts of the polyester prepolymer, were added and the mixture was polycondensed in the presence of a conventional polycondensation catalyst to obtain a polyester having an intrinsic viscosity of 0.620 dl/g.

100 parts of the obtained polyester was mixed with 5 parts of a conventional polypropylene and 6 parts of a rutile-type titanium dioxide having an average particle diameter of 0.4 μm and coated with zinc stearate to form a resin mixture. The obtained resin was dried, melted, and extruded to form a cast sheet. This sheet was extended in a drawing ratio of 3.5:1 in the longitudinal and transverse directions at 120° C. to provide a biaxially oriented polymer film having the thickness of 120 μm.

The properties of the film were measured and the results were shown in Table 4.

As shown in Table 4 below, the film thus prepared exhibits excellent physical properties.

EXAMPLES 4-2 to 4-6

The procedure of Example 4-1 was repeated except that the amounts of the additives and polypropylene were varied as shown in Table 4 below.

The properties of the film were measured and the results were shown in Table 4.

Comparative Examples 4-1 to 4-18

The procedure of Example 4-1 was repeated except that the amounts of the additives and polypropylene were varied as shown in Table 4 below.

The properties of the film were measured and the results were shown in Table 4.

TABLE 4

| | | Additives | | | | | | | | |
|---|---|---|---|---|---|---|---|---|---|---|
| | | Titanium Dioxide | | | | Calcium carbonate | | Alumina | | |
| | | Crys- talline Struc- ture | Average Particle Diameter μm | Amount part | Coating Amount of Zinc part | Average Particle Diameter μm | Amount part | Crys- talline Struc- ture | Average Particle Diameter μm | Amount part |
| Ex. | 4-1 | Rutile | 0.4 | 6 | 0.03 | 0.8 | 0.25 | γ | 0.1 | 0.3 |
| | 4-2 | Rutile | 0.4 | 8 | 0.03 | 0.8 | 0.3 | γ | 0.1 | 0.25 |
| | 4-3 | Rutile | 0.4 | 10 | 0.03 | 0.8 | 0.22 | γ | 0.1 | 0.3 |

TABLE 4-continued

|  |  |  |  |  |  |  |  |  |  |  |
|---|---|---|---|---|---|---|---|---|---|---|
|  | 4-4 | Rutile | 0.4 | 7 | 0.03 | 0.8 | 0.35 | γ | 0.1 | 0.3 |
|  | 4-5 | Rutile | 0.4 | 6 | 0.03 | 0.8 | 0.3 | γ | 0.1 | 0.3 |
|  | 4-6 | Rutile | 0.4 | 5 | 0.03 | 0.8 | 0.2 | γ | 0.1 | 0.3 |
| Comp. | 4-1 | Anatase | 0.4 | 5 | 0.03 | 0.7 | 0.25 | γ | 0.1 | 0.3 |
| Ex. | 4-2 | Rutile | 0.005 | 5 | 0.03 | 0.8 | 0.25 | γ | 0.1 | 0.3 |
|  | 4-3 | Rutile | 0.4 | 5 | 0.03 | 0.8 | 0.25 | γ | 0.1 | 0.3 |
|  | 4-4 | Rutile | 0.4 | 0.05 | 0.03 | 0.8 | 0.25 | γ | 0.1 | 0.3 |
|  | 4-5 | Rutile | 0.4 | 30 | 0.03 | 0.8 | 0.25 | γ | 0.1 | 0.3 |
|  | 4-6 | Rutile | 0.4 | 5 | 0.03 | 0.08 | 0.2 | γ | 0.1 | 0.3 |
|  | 4-7 | Rutile | 0.4 | 5 | 0.03 | 12 | 0.25 | γ | 0.1 | 0.3 |
|  | 4-8 | Rutile | 0.4 | 5 | 0.03 | 0.8 | 0.05 | γ | 0.1 | 0.3 |
|  | 4-9 | Rutile | 0.4 | 5 | 0.03 | 0.8 | 1.5 | γ | 0.1 | 0.3 |
|  | 4-10 | Rutile | 0.4 | 5 | 0.03 | 0.8 | 0.25 | α | 0.1 | 0.3 |
|  | 4-11 | Rutile | 0.4 | 5 | 0.03 | 0.8 | 0.25 | γ | 0.1 | 0.3 |
|  | 4-12 | Rutile | 0.4 | 5 | 0.03 | 0.8 | 0.25 | γ | 0.1 | 5 |
|  | 4-13 | Rutile | 0.4 | 5 | 0.03 | 0.8 | 0.25 | γ | 0.005 | 0.3 |
|  | 4-14 | Rutile | 0.4 | 5 | 0.03 | 0.8 | 0.25 | γ | 1.5 | 0.3 |
|  | 4-15 | Rutile | 0.4 | 5 | 0.03 | 0.8 | 0.25 | γ | 0.1 | 0.3 |
|  | 4-16 | Rutile | 0.4 | 5 | 0.03 | 0.8 | 0.25 | γ | 0.1 | 0.3 |
|  | 4-17 | Rutile | 0.4 | 5 | 0.05 | 0.8 | 0.25 | γ | 0.1 | 0.3 |
|  | 4-18 | Rutile | 0.4 | 5 | 0.20 | 0.8 | 0.25 | γ | 0.1 | 0.3 |

| | | Polypropylene Amount part | Physical Properties of Film | | | | | | |
|---|---|---|---|---|---|---|---|---|---|
| | | | Surface Gloss % | Transmittance % | Degree of Whiteness % | Reflectivity % | Light Resistance % | Strength at Breakage kg/mm$^2$ | Scratch Resistance — | Processability — |
| Ex. | 4-1 | 5 | 68 | 12 | 91 | 88 | 0.2 | 18.5 | ● | ● |
|  | 4-2 | 4 | 70 | 10 | 91 | 91 | 0.1 | 19.0 | ● | ● |
|  | 4-3 | 6 | 65 | 9 | 93 | 90 | 0.2 | 18.0. | ● | ● |
|  | 4-4 | 5 | 71 | 10 | 89 | 90 | 0.1 | 19.2 | ● | ● |
|  | 4-5 | 7 | 70 | 11 | 88 | 91 | 0.1 | 17.5 | ● | ● |
|  | 4-6 | 3 | 61 | 13 | 87 | 90 | 0.1 | 18.7 | ● | ● |
| Comp. | 4-1 | 5 | 65 | 10 | 91 | 90 | 0.6 | 18.6 | ● | ● |
| Ex. | 4-2 | 5 | 60 | 11 | 80 | 81 | 0.3 | 17.6 | Δ | ● |
|  | 4-3 | 5 | 60 | 12 | 83 | 82 | 0.5 | 18.5 | ● | Δ |
|  | 4-4 | 5 | 61 | 25 | 75 | 73 | 0.6 | 17.9 | ● | ● |
|  | 4-5 | 5 | 70 | 4 | 90 | 85 | 0.9 | 19.0 | ● | Δ |
|  | 4-6 | 5 | 54 | 15 | 91 | 89 | 0.6 | 16.9 | ● | ● |
|  | 4-7 | 5 | 75 | 10 | 90 | 88 | 0.8 | 18.2 | ● | ● |
|  | 4-8 | 5 | 60 | 11 | 91 | 87 | 0.6 | 17.9 | ● | ● |
|  | 4-9 | 5 | 71 | 12 | 90 | 89 | 0.5 | 18.2 | Δ | ● |
|  | 4-10 | 5 | 65 | 16 | 89 | 85 | 1.5 | 17.9 | ● | X |
|  | 4-11 | 5 | 68 | 14 | 85 | 87 | 0.9 | 18.1 | X | ● |
|  | 4-12 | 5 | 66 | 12 | 86 | 86 | 0.5 | 18.9 | Δ | ● |
|  | 4-13 | 5 | 67 | 14 | 84 | 84 | 0.6 | 18.2 | X | ● |
|  | 4-14 | 5 | 63 | 11 | 87 | 86 | 1.2 | 17.6 | Δ | X |
|  | 4-15 | 0.5 | 65 | 10 | 89 | 82 | 0.5 | 23.2 | ● | ● |
|  | 4-16 | 30 | 66 | 12 | 86 | 84 | 2.1 | 10.9 | X | X |
|  | 4-17 | 5 | 67 | 11 | 85 | 86 | 1.1 | 18.2 | ● | ● |
|  | 4-18 | 5 | 63 | 13 | 86 | 84 | 1.9 | 17.6 | ● | ● |

As shown from the results of the above table 4, the polymer film prepared from a mixture of 100 parts of the polyester resin, 1 to 20 parts of a rutile-type titanium dioxide having an average particle diameter ranging from 0.01 to 1 μm and coated with zinc, 0.01 to 1 part of calcium carbonate having an average particle diameter ranging from 0.1 to 10 μm, 0.01 to 1 part of a γ alumina having an average particle diameter ranging from 0.01 to 1 μm, and 1 to 20 parts of polyolefin resin, possesses excellent physical properties such as bulk density, surface gloss, transmittance, degree of whiteness, reflectivity at 440 nm, light resistance, film surface resistance and strength at breakage, and processability.

EXAMPLE 5-1

60 parts of dimethyl terephthalate and 40 parts of ethylene glycol were transesterified in the presence of a transesterification catalyst to form a polyethylene terephthalate monomer, i.e., bis-2-hydroxyethyl terephthalate. To the resultant, 5 parts of a cubic titanium dioxide having an average particle diameter of 0.5 μm, 0.002 part of a fluorescent organic whitening agent, and 0.1 part of bis 2,4-di-t-butyl phenylpentaerythritoldiphosphite, 0.1 part of triphenylphosphate and 0.15 parts of tetrakis 3,5-di-t-butyl hydroxyphenylpropanoyloxymethyl methane based on 100 parts of the polyester prepolymer, were added and the mixture was polycondensed in the presence of a conventional polycondensation catalyst to obtain a polyester polymer having an intrinsic viscosity of 0.620 dl/g.

100 parts of the obtained polyester was mixed with 15 parts of a polypropylene resin, and the obtained resin mixture was dried, melted, and extruded to form a cast sheet. The sheet was extended in a drawing ratio of 3.5:1 in the longitudinal and transverse directions at 120° C. to provide biaxially oriented film having the thickness of 200 μm.

The properties of the film were measured and the results were shown in Table 5.

As shown in Table 5 below, the film thus prepared exhibits excellent physical properties.

EXAMPLES 5-2 to 5-6

The procedure of Example 5-1 was repeated except that the amounts of the additives and polyolefin were varied as shown in Table 5 below.

The properties of the film were measured and the results were shown in Table 5.

Comparative Examples 5-1 to 5-10

The procedure of Example 5-1 was repeated except that the amounts of the additives and polyolefin were varied as shown in Table 5 below.

The properties of the film were measured and the results were shown in Table 5.

TABLE 5

| | | | Additives | | | | Poly-olefin part | Bulk Density (g/cc) | Surface Gloss (%) | Transmittance (%) | Reflectivity (%) | Degree of Whiteness (%) | Color-b (%) | Dimensional Stability (%) | Strength at Breakage (kg/mm²) | Softness | Appearance |
|---|---|---|---|---|---|---|---|---|---|---|---|---|---|---|---|---|---|
| | | (A) part | (B) part | (C) part | (D) part | (E) part | | | | | | | | | | | |
| Ex. | 5-1 | 5 | 0.002 | 0.1 | 0.1 | 0.15 | 15 | 1.02 | 61 | 1.2 | 88 | 94 | 0.5 | 1.0 | 18.5 | good | good |
| | 5-2 | 5 | 0.002 | 0.1 | 0.1 | 0.15 | 20 | 0.98 | 63 | 1.0 | 87 | 95 | 0.7 | 1.2 | 18.1 | good | good |
| | 5-3 | 5 | 0.002 | 0.1 | 0.1 | 0.15 | 10 | 1.09 | 62 | 1.1 | 89 | 94 | 0.5 | 0.8 | 19.2 | good | good |
| | 5-4 | 10 | 0.002 | 0.1 | 0.1 | 0.15 | 15 | 1.11 | 61 | 0.9 | 89 | 96 | 0.5 | 1.0 | 18.6 | good | good |
| | 5-5 | 5 | 0.002 | 0.05 | 0.05 | 0.15 | 15 | 1.05 | 57 | 1.1 | 87 | 93 | 0.6 | 1.0 | 18.5 | good | good |
| | 5-6 | 5 | 0.002 | 0.1 | 0.1 | 0.1 | 15 | 1.03 | 59 | 1.2 | 88 | 94 | 0.5 | 1.0 | 18.3 | good | good |
| Comp. Ex. | 5-1 | 5 | 0.002 | 0.1 | 0.1 | 0.15 | 50 | 0.89 | 42 | 0.7 | 84 | 81 | 3.8 | 4.3 | 7.1 | good | poor |
| | 5-2 | 5 | 0.002 | 0.1 | 0.1 | 0.15 | 0 | 1.41 | 64 | 1.3 | 90 | 92 | 0.1 | 0.8 | 20.7 | poor | good |
| | 5-3 | 30 | 0.002 | 0.1 | 0.1 | 0.15 | 15 | 1.31 | 60 | 0.9 | 89 | 96 | 0.4 | 0.9 | 18.4 | poor | good |
| | 5-4 | 0 | 0.002 | 0.1 | 0.1 | 0.15 | 15 | 0.97 | 62 | 3.1 | 87 | 84 | 0.6 | 1.1 | 19.1 | good | poor |
| | 5-5 | 5 | 1.0 | 0.1 | 0.1 | 0.15 | 15 | 1.03 | 63 | 1.1 | 94 | 96 | −0.1 | 1.2 | 18.3 | good | poor |
| | 5-6 | 5 | 0 | 0.1 | 0.1 | 0.15 | 15 | 1.01 | 62 | 1.2 | 68 | 92 | 0.7 | 0.8 | 18.7 | good | poor |
| | 5-7 | 5 | 0.002 | 1.0 | 0.5 | 1.0 | 15 | 1.03 | 59 | 1.2 | 87 | 87 | 3.1 | 1.1 | 16.1 | good | poor |
| | 5-8 | 5 | 0.002 | 0.1 | 0 | 0 | 15 | 1.04 | 60 | 1.1 | 86 | 90 | 4.0 | 1.1 | 15.2 | good | poor |
| | 5-9 | 5 | 0.002 | 0 | 0 | 0.15 | 15 | 1.05 | 59 | 1.1 | 88 | 89 | 3.0 | 1.5 | 9.9 | good | poor |
| | 5-10 | 5 | 0.002 | 0 | 0 | 0 | 15 | 1.04 | 59 | 1.2 | 87 | 88 | 4.5 | 1.9 | 9.2 | good | poor |

(A): Titanium Dioxide (average particle diameter, 0.5 μm)
(B): Oxazoles (Fluorescent Whitening Agent)
(C): Bis 2,4-di-t-butylpentaerythritoldiphosphite
(D): Triphenylphosphate
(E): Tetrakis 3,5-di-t-butylhydroxyphenylpropanoyloxymethylmethane As shown from the results of the above table 5, the polymer film prepared from a mixture of 100 parts of the polyester resin which contains 0.1 to 15 parts of an inorganic compound, 0.0005 to 0.5 part of a fluorescent organic whitening agent, 0.005 to 0.5 part of phosphoric compound and 0.005 to 0.5 part of hindered phenol stabilizer, and 5 to 40 parts of polyolefin resin, possesses excellent physical properties such as bulk density, surface gloss, transmittance, degree of whiteness, dimensional stability, reflectivity at 440 nm, strength at breakage, softness and appearance.

While the invention has been described in connection with the above specific embodiments, it should be recognized that various modifications and changes may be made within the scope of the invention as defined by the claims that follow.

What is claimed is:

1. A biaxially oriented polymer film which comprises a resin mixture consisting of 70 to 95 parts by weight of a polyester resin containing not less than 60% by weight of repeating units of ethylene terephthalate and having an intrinsic viscosity ranging from 0.4 to 0.9 dl/g, and 5 to 30 parts by weight of polypropylene resin having a melting flow index ranging from 1.5 to 25 g/min; a metal sulfonate of formula (I) having an acid value of 0.1 mg KOH/g or less in an amount ranging from 0.01 to 1.0 part by weight based on 100 parts by weight of the resin mixture; and a metal-coated silica having an average particle diameter ranging from 1 to 5 μm in an amount ranging from 1.0 to 10 parts by weight based on 100 parts by weight of the resin mixture:

$$R_1\text{—}C_6H_4\text{—}SO_3M_e \qquad (I)$$

wherein, $R_1$ is a $C_5$–$C_{25}$ alkyl group; and $M_e$ is an alkali or alkali earth metal.

2. The biaxially oriented polymer film of claim 1, wherein said silica is coated with a metal selected from the group consisting of silver, copper and zinc.

* * * * *